United States Patent [19]
Barton

[11] Patent Number: 5,015,433
[45] Date of Patent: May 14, 1991

[54] NEUTRON ACTIVATED SWITCH

[75] Inventor: David M. Barton, Espanola, N. Mex.

[73] Assignee: The United States of America as represent by the United States Department of Energy, Washington, D.C.

[21] Appl. No.: 428,681

[22] Filed: Oct. 30, 1989

[51] Int. Cl.$^5$ .............................................. G21C 17/00
[52] U.S. Cl. ...................... 376/245; 376/336; 250/390.01; 337/306
[58] Field of Search ............. 376/245, 277, 336, 158, 376/337, 254, 255, 463; 250/390.01, 391; 337/306; 102/200

[56] References Cited

U.S. PATENT DOCUMENTS

| | | | |
|---|---|---|---|
| 3,783,285 | 1/1974 | Parker | 250/390.01 |
| 3,897,302 | 7/1975 | Klein | 376/336 |
| 3,970,007 | 7/1976 | Klein | 376/219 |
| 4,880,596 | 11/1989 | Barrus et al. | 376/336 |

FOREIGN PATENT DOCUMENTS 2122410  1/1984  United Kingdom ................ 376/336

OTHER PUBLICATIONS

"Development of Self Actuated Shutdown Systems for LMFBR Plants", ANL/CT-74-10, pp. 34, 35, 44, 48, 49, 4/74.

*Primary Examiner*—Daniel D. Wasil
*Attorney, Agent, or Firm*—Milton D. Wyrick; Paul D. Gaetjens; William R. Moser

[57] ABSTRACT

A switch for reacting quickly to a neutron emission. A rod consisting of fissionable material is located inside a vacuum tight body. An adjustable contact is located coaxially at an adjustable distance from one end of the rod. Electrical leads are connected to the rod and to the adjustable contact. With a vacuum drawn inside the body, a neutron bombardment striking the rod causes it to heat and expand longitudinally until it comes into contact with the adjustable contact. This circuit closing occurs within a period of a few microseconds.

7 Claims, 2 Drawing Sheets

NEUTRON ACTIVATED SWITCH

The present invention is generally related to fast reaction switches and, more particularly, to switches responsive to the rapid emission of neutrons. The invention is a result of a contract with the Department of Energy (Contract No. W-7405-ENG-36).

BACKGROUND OF THE INVENTION

In the field of nuclear physics research, many devices produce a large flux of neutrons within a period of a few microseconds. Examples of such devices are burst reactors, atomic and thermonuclear bombs, accelerators, and excursions of critical masses of fissionable material in reprocessing plants used to separate fissionable isotopes from spent fuel elements. It is often necessary to trigger equipment such as cameras, sensors, alarms or relays at a time extremely soon after such devices emit a burst of neutron radiation.

Other radiations are typically associated with the production of neutrons from such devices. These other radiations may include gamma rays, beta particles and electromagnetic radiation. Often, these radiations will activate competing reactions in detectors used to measure neutron emission. These competing reactions can limit the usefulness of those detectors.

In laboratory and plant environments it is very important to be able to detect the emission of neutrons by a material and produce an alarm in the shortest possible time. For example, neutron detection is important for personnel protection during the reprocessing of spent fuel rods removed from nuclear reactors.

Although there are numerous commercial neutron detectors available, many are not sufficiently fast to allow experimenters to conduct certain experiments. Neutron detectors that require relays to operate ancillary equipment require approximately 0.01 sec to operate. This amount of time can be too long for some experimental applications, where most events associated with the experiments would be over before the relay closed.

The present invention solves these problems by providing apparatus which has the ability to discriminate against gamma and other competing radiations, and to respond to neutron radiation. It also responds within microseconds, much faster than conventional relays which require 0.01 seconds when actuated by currents from ion chambers or photo tubes.

The invention is capable of this performance because it directly utilizes the neutron burst to produce fissions in an active element constructed of a fissionable material. The fission fragment energy is converted to heat by collisions in the active element. Metals respond almost instantaneously to heat energy and convert the heat to a change in dimension. The heating of the active element by fission is orders of magnitude greater than that produced by other radiations. This fact provides the discrimination against deleterious effects from such other radiations.

It is therefore an object of the present invention to provide a switch capable of closing within a few microseconds after bombardment by a large flux of neutrons.

It is a further object of the present invention to provide a fast reacting neutron activated switch which discriminates against other radiations which may be present in the neutron flux.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise an electrically conductive rod of fissionable material having first and second ends and longitudinally expandable when bombarded with neutron radiation; and an electrically conductive contact coaxially spaced apart an adjustable distance from the first end of the conductive rod for completing a circuit through the conductive rod after the rod has longitudinally expanded due to neutron bombardment.

In a further aspect of the present invention, and in accordance with its objects and purposes, a method of closing a contact in the presence of neutron radiation comprises the steps of placing an electrically conductive rod of fissionable material in a vacuum tight housing; placing an adjustable contact through the housing positioned coaxial with but spaced apart an adjustable distance from the electrically conductive rod; maintaining a vacuum inside the housing; bombarding the conductive rod with neutron radiation; and closing a circuit through the conductive rod and the adjustable contact when the electrically conductive contact longitudinally expands against the adjustable contact.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
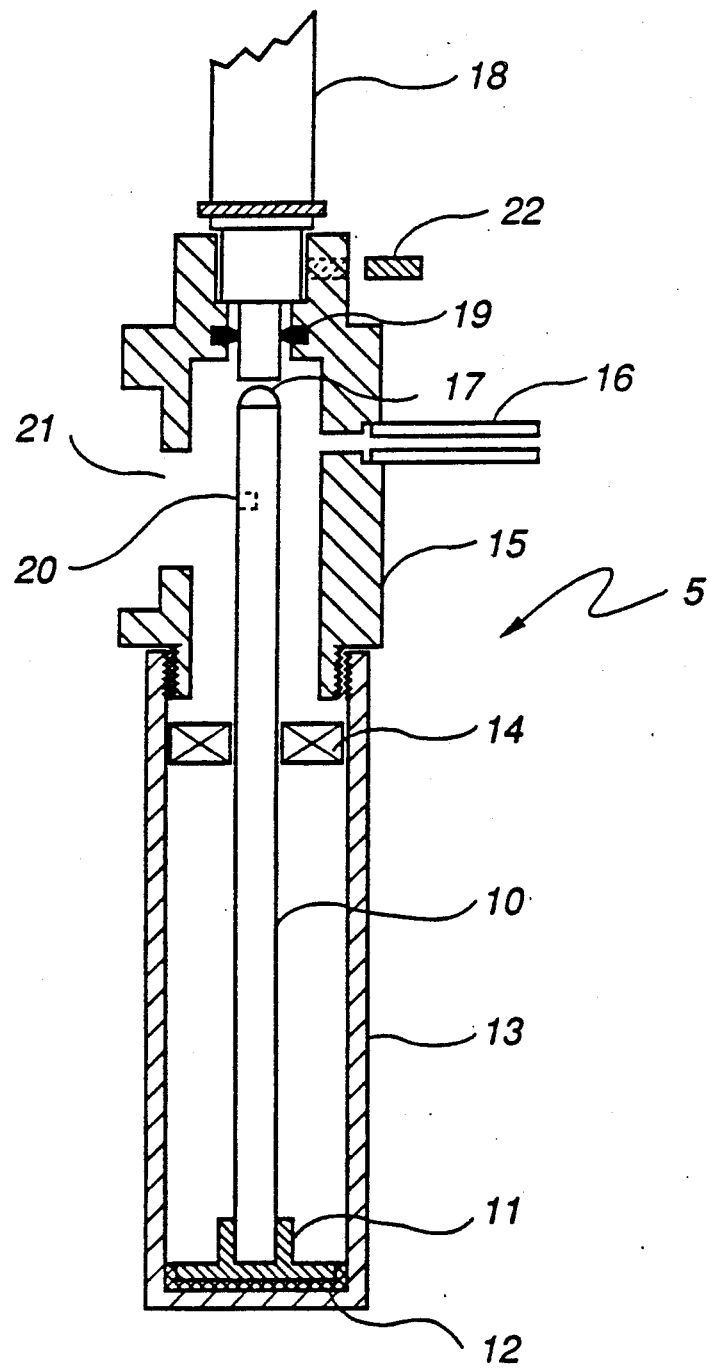
FIG. 1 is a cross sectional view of a neutron activated switch according to the present invention.

Referring to FIG. 1, there can be seen a cross-sectional view of one embodiment of the invention where switch 5 is shown containing longitudinally expandable electrode 10 enclosed within lower tube 13 and upper body 15. Electrode 10 is supported in lower tube 13 by electrode support 11 which rests on cushion 12. Support 11 may be made of an electrically conductive material, such as brass. Cushion 12 is a nonconductive material, which may conveniently be TEFLON ®.

Lower tube 13, as it provides support for electrode 10 should be made of a material having a low coefficient of expansion, which in one embodiment may be quartz. Electrode 10 is maintained in a vertical position within lower tube 13 by spacer 14, which also may be constructed of TEFLON ®.

In order for electrode to be longitudinally expandable in the presence of a neutron bombardment, it must be constructed of a fissionable material. In one embodiment, electrode 10 is constructed of Uranium$^{235}$ ($U^{235}$). There is no reason that other fissionable materials cannot be utilized, as long as they may be formed generally into the shape of electrode 10 and expand longitudinally in the presence of neutrons.

Electrode 10 preferably has electrically conductive contact 17 attached at its upper end. Conductive contact 17 may be stainless steel. In one embodiment, conductive conduct 17 may be shaped as a round head screw. In this case, the upper end of electrode 10 has a mating threaded cavity to receive conductive contact 17.

Located coaxially above electrode 10 is adjustable contact 18, a micrometer head. Adjustable contact 18 is sealed within upper body 15 by 0-ring 19. Adjustment of the gap between conductive contact 17 of electrode 10 and adjustable contact 18 allows variance in the closing time of switch 5. This adjustment capability allows switch closing times to be set for a particular application. Conductive contact 17 assures a reliable connection with adjustable contact 18. Adjustable contact 18 is fixed within upper body 15 by set screw 22. Electrical leads (not shown) to switch may be connected directly to electrode 10 and to upper body 15.

Figure 2:
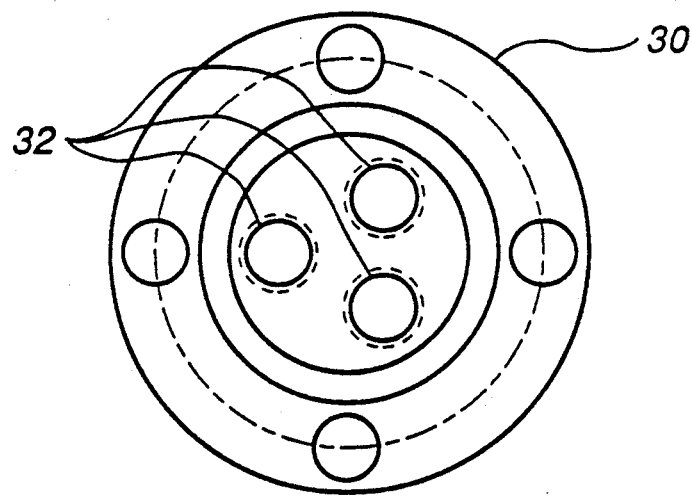
FIG. 2 is a plan view of a circular access cover according to the present invention.

Upper body 15 is flattened in the area of access port 21, and is covered by vacuum tight access cover 30. A circularly configured embodiment of access cover 30 is shown in FIG. 2, with three access ports 32 in its central area.

As shown in FIG. 1, electrode 10 has bore 20 cut into its upper portion. Bore 20 is sized to accommodate insertion of a thermocouple (not shown) to monitor the temperature of electrode 10. The electrical leads for the thermocouple and for switch 5 itself, as well as any other desired cabling are routed through Kovar ® seals (not shown) in access ports 32 in access cover 30 (FIG. 2).

With access cover 30 installed onto upper body 15 (FIG. 1), a vacuum is drawn within upper body 15 and lower tube 13 (FIG. 1) through vacuum port 16 (FIG. 1). The vacuum is necessary so that there will be no ionization inside switch 5 due to gamma or other radiation.

Operation of switch 5 can be best understood by reference back to FIG. 1. With a vacuum drawn, any neutrons entering the interior portions of switch 5 will strike electrode 10. As electrode 10 is comprised of a fissionable material, it will expand rapidly under neutron bombardment. This expansion will cause conductive contact 17 to move into adjustable contact 18, completing the circuit. Calculations have indicated that the closing time of switch 5 in the presence of a neutron bombardment is on the order of a few microseconds. This compares very favorably with conventional relays and solenoids which require approximately 0.01 second to operate.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A switch activated by neutron radiation comprising:
    an electrically conductive rod of fissionable material having first and second ends and longitudinally expandable when bombarded with neutron radiation; and
    an electrically conductive contact coaxially spaced apart an adjustable distance from said first end of said electrically conductive rod for completing a circuit through said electrically conductive rod after said rod has longitudinally expanded due to said neutron bombardment.

2. The switch as described in claim 1 further comprising a metallic contact inserted into said first end of said electrically conductive rod.

3. The switch as described in claim 2 further comprising sealed housing means surrounding said electrically conductive rod and said electrically conductive contact for maintaining a vacuum inside said sealed housing means.

4. The switch as described in claim 3, wherein a vacuum is maintained in said sealed housing means.

5. The switch as described in claim 1, wherein said electrically conductive rod comprises Uranium$^{235}$.

6. The switch as described in claim 1, further comprising electrically conductive leads connected to said electrically conductive rod and to said adjustable contact.

7. A method of closing a contact in the presence of neutron radiation comprising the steps of:
    placing an electrically conductive rod of fissionable material in a vacuum tight housing;
    placing an adjustable contact through said housing positioned coaxial with but spaced apart an adjustable distance from said electrically conductive rod;
    maintaining a vacuum inside said housing;
    bombarding said electrically conductive rod with said neutron radiation; and
    closing a circuit through said electrically conductive rod and said adjustable contact when said electrically conductive rod longitudinally expands against said adjustable contact.

* * * * *